United States Patent
Li

(10) Patent No.: US 10,111,029 B2
(45) Date of Patent: Oct. 23, 2018

(54) USER RECOMMENDATION METHOD AND SYSTEM, MOBILE TERMINAL, AND SERVER

(71) Applicant: TENCENT TECHNOLOGY (SHENZHEN) COMPANY LIMITED, Shenzhen (CN)

(72) Inventor: Kaifeng Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/936,772

(22) Filed: Mar. 27, 2018

(65) Prior Publication Data

US 2018/0220260 A1 Aug. 2, 2018

Related U.S. Application Data

(63) Continuation of application No. PCT/CN2016/105447, filed on Nov. 11, 2016.

(30) Foreign Application Priority Data

Dec. 14, 2015 (CN) .......................... 2015 1 0925657

(51) Int. Cl.
*H04W 4/02* (2018.01)

(52) U.S. Cl.
CPC .................................. *H04W 4/02* (2013.01)

(58) Field of Classification Search
CPC . H04W 12/08; H04W 72/0406; H04W 4/026; H04W 4/027; H04W 4/14; H04W 4/80
See application file for complete search history.

(56) References Cited

U.S. PATENT DOCUMENTS

| 8,737,691 B2* | 5/2014 | Sivaraman ......... G01C 21/3476 382/104 |
| 2011/0314502 A1* | 12/2011 | Levy ..................... H04N 7/106 725/46 |

(Continued)

FOREIGN PATENT DOCUMENTS

| CN | 102461129 A | 5/2012 |
| CN | 103096242 A | 5/2013 |

(Continued)

OTHER PUBLICATIONS

The World Intellectual Property Organization (WIPO) International Search Report for PCT/CN2016/105447 dated Jan. 20, 2017 5 Pages (including translation).

(Continued)

*Primary Examiner* — Diane Mizrahi
(74) *Attorney, Agent, or Firm* — Anova Law Group, PLLC

(57) ABSTRACT

A user recommendation method is described. First location information sent by an aircraft is received, where the first location information indicating a first location of a first user. A first user identifier and the first location information are sent to a server. A second user identifier is found by the server and received, where a location associated with the second user is within a range of the first location. A user recommendation list is generated according to the second user identifier.

18 Claims, 10 Drawing Sheets

(56) References Cited

U.S. PATENT DOCUMENTS

| | | | |
|---|---|---|---|
| 2012/0036015 A1* | 2/2012 | Sheikh ................ | G06Q 30/02 705/14.54 |
| 2012/0237028 A1 | 9/2012 | Khazan et al. | |
| 2015/0120530 A1 | 4/2015 | Jung et al. | |

FOREIGN PATENT DOCUMENTS

| | | |
|---|---|---|
| CN | 103905976 A | 7/2014 |
| CN | 104917966 A | 9/2015 |
| CN | 105141851 A | 12/2015 |
| CN | 105530607 A | 4/2016 |

OTHER PUBLICATIONS

The State Intellectual Property Office of the People's Republic of China (SIPO) Office Action 1 for 201510925657.3 dated Oct. 21, 2016 6 Pages (including translation).

\* cited by examiner

USER RECOMMENDATION METHOD AND SYSTEM, MOBILE TERMINAL, AND SERVER

RELATED APPLICATION

This application claims priority to PCT Application No. PCT/CN2016/105447, filed on Nov. 11, 2016, which claims priority to Chinese Patent Application No. 2015109256573, filed with the Chinese Patent Office on Dec. 14, 2015, and entitled "USER RECOMMENDATION METHOD, APPARATUS, AND SYSTEM." The two applications are both incorporated herein by reference in their entirety.

FIELD OF THE TECHNOLOGY

The present disclosure relates to the field of smart terminal technologies, and in particular, to a user recommendation method, a user recommendation system, a mobile terminal, and a server.

BACKGROUND OF THE DISCLOSURE

With the development of Internet technologies, more social networking applications and social networking platforms provide a function of recommending a user, that is, recommending to a user, another user sharing certain common features with the first user. For example, a social network application may recommend to a user another user whose geographic location is close by. The user may make a selection from a recommendation list to follow a nearby person or befriend a nearby person, thereby enhancing interaction between users.

When recommending a user based on location information, a social networking application often locates a user based on a mobile terminal carried along by the user, and locates another user within a particular range of a distance to the user's current position. However, the user can only obtain, by using an electronic device carried along by the user, the user recommendation. The method thus has its limitations.

SUMMARY

A user recommendation method, a user recommendation system, a mobile terminal, and a server disclosed in this application resolve one or more problems related to the background.

A user recommendation method is described. First location information sent by an aircraft is received, where the first location information indicates a first location of a first user. A first user identifier and the first location information are sent to a server. A second user identifier is found by the server and received, where a location associated with the second user is within a range of the first location. A user recommendation list is generated according to the second user identifier.

Another user recommendation method is described. First location information sent by a mobile terminal and a corresponding first user identifier is received, where the first location information indicates a first location of an aircraft bound to the first user identifier. Second location information that identifies a location within a range of the first location is searched for, where the second location information indicates a second location of an aircraft bound to a second user identifier. The second user identifier corresponding to the second location information is obtained. A user recommendation list according to the second user identifier. The user recommendation list is sent to the mobile terminal corresponding to the first user identifier.

A mobile terminal is described. The mobile terminal includes a memory and a processor, the memory storing an computer program instruction, and when executed by the processor, the instruction causing the processor to perform certain operations. The mobile terminal receives first location information sent by an aircraft; sends a first user identifier and the first location information to a server; and receives a second user identifier that is found by the server, where a location associated with the second user is within a range of the first location. The mobile terminal further generates a user recommendation list according to the second user identifier.

A server is described. The server includes a memory and a processor, the memory storing one or more computer program instructions, and when executed by the processor, the computer program instructions causing the processor to perform certain operations. The server receives first location information sent by a mobile terminal and a corresponding first user identifier, where the first location information indicates a first location of an aircraft bound to the first user identifier. The server searches for second location information that identifies a location within a range of the first location, where the second location information indicates a second location of an aircraft bound to a second user identifier. The server further obtains the second user identifier corresponding to the second location information; generates a user recommendation list according to the second user identifier; and sends the user recommendation list to the mobile terminal corresponding to the first user identifier.

A user recommendation system is described. The user recommendation system includes: an aircraft, a first mobile terminal, and a server. The aircraft is configured to: position the aircraft, and send first location information to the first mobile terminal that corresponds to a first user identifier bound to the aircraft, where the first location information indicates a first location of the aircraft. The first mobile terminal is configured to: receive the first location information, and send the first user identifier and the first location information to the server. The server is configured to: receive the first location information, search for a second user identifier that identifies a location within a range of the first location, and recommend the second user identifier to the first mobile terminal.

Details of one or more embodiments of the present invention are provided in the following accompanying drawings and descriptions. Other features, objectives, and advantages of the present disclosure are obvious in this specification, the accompanying drawings, and the claims.

BRIEF DESCRIPTION OF THE DRAWINGS

To describe the technical solutions in the embodiments of the present invention or in the existing technologies more clearly, the following briefly describes the accompanying drawings required for describing the embodiments or the existing technologies. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

Figure 1:
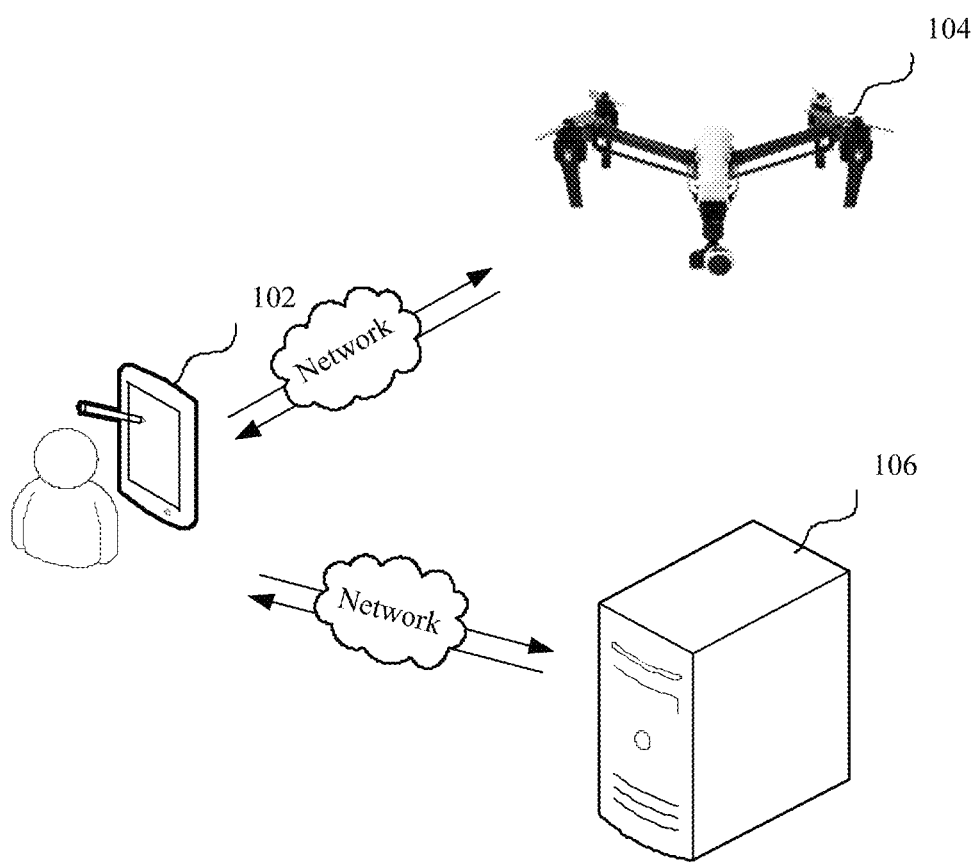
FIG. 1 is a diagram of an application environment of a user recommendation method according to an embodiment.

A user recommendation method provided in an embodiment of the present disclosure may be applied to a system shown in FIG. 1. Referring to FIG. 1, an application may be executed on a mobile terminal 102, and the mobile terminal 102 obtains, by using the application, user login information and verifies the user login information. After verification succeeds, the mobile terminal 102 may operate an aircraft 104, for example, operate the aircraft 104 to move back and forth and left and right, or operate a lens linked to the aircraft to rotate up and down. The aircraft 104 may be an Unmanned Ariel Vehicle that can be controlled remotely by a controller, a smart phone, a computer, etc. The mobile terminal 102 may further operate the aircraft 104 to record multimedia data, and store the multimedia data in the aircraft 104. The mobile terminal 102 may download the multimedia data from the aircraft to view the recorded video. In this embodiment, the aircraft 104 is provided with a positioning module, such as a GPS positioning module. By using a built-in GPS positioning module and a satellite antenna, a location of the aircraft may be quickly positioned. In a process of operating the aircraft 104 by the mobile terminal 102, the mobile terminal 102 maintains a connection to the aircraft. Location information of the aircraft 104 obtained by the aircraft by positioning may be transmitted in real time to the mobile terminal 102 through a wireless connection.

In the present disclosure, the location information may refer to date indicative of one or more geographical locations. For example, the location information of the aircraft 104 may identify the position of aircraft 104. The location information of the mobile terminal 102 may identify the position of mobile terminal 102. In the present disclosure, first location information may identify a first location of a mobile terminal or an aircraft. Second location information may identify a second location of a mobile terminal or an aircraft.

The mobile terminal 102 may receive the location information of the aircraft 104, and may display a current geographic location of the aircraft 104 on a corresponding interface of the application, for example, display a current location of the aircraft 104 in a map application.

Further, after receiving the location information of the aircraft 104, the mobile terminal 102 may correspondingly send the location information and user identifiers to a server 106. The server 106 may be an application server, or a server cluster including an application server and another server. The server 106 may receive a large amount of location information that is uploaded by the mobile terminal and that is of the aircraft operated by the mobile terminal, and user identifiers corresponding to the location information, and store location information of a correspondingly-operated aircraft corresponding to a user identifier. When receiving an instruction of the mobile terminal 102 on viewing a neighbouring aircraft, the server 106 may search for, according to first location information of the aircraft sent by the mobile terminal 102, second location information which identifies a position within a distance range to the first location identified in the first location information is, and further obtain a user identifier corresponding to the second location information. A user corresponding to the user identifier may be a user who operates an aircraft near the aircraft operated by the mobile terminal 102. Further, the server 106 may recommend the identified user to the mobile terminal 102. The mobile terminal 102 may be, but is not limited to, various smartphones, tablet computers, wearable electronic devices, and the like. The aircraft 104 may be, but is not limited to, various flying-type devices that can perform positioning and data transmission, such as an unmanned aerial vehicle and a toy drone.

Figure 2:
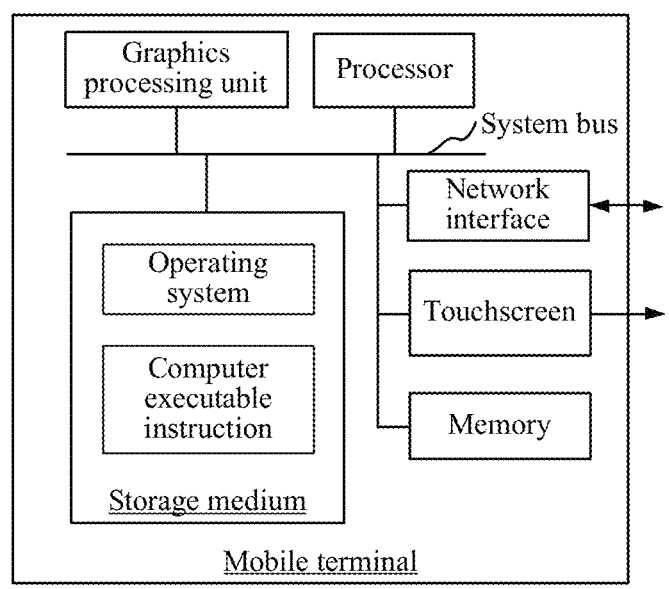
FIG. 2 is a diagram of an internal structure of a mobile terminal according to an embodiment.

In an embodiment of the present disclosure, as shown in FIG. 2, a mobile terminal is further provided. The mobile terminal may include a processor, a graphics processing unit, a storage medium, a memory, a network interface, a touchscreen display, and an input device that are connected by using a system bus. The storage medium may store an operating system, and further stores a computer executable instruction. When the computer executable instruction is executed by the processor, a user recommendation method may be implemented. The processor may be configured to provide computing and controlling capabilities, to support operations of an entire electronic device. The graphics processing unit in the mobile terminal may be configured to at least provide a capability of drawing an operating interface of an application, for example, drawing an interface element on an operating interface of an aircraft, and drawing a received user recommendation list. The memory may be configured to provide an environment for implementation of a user recommendation apparatus in the storage medium, and the network interface may be configured to: perform network communication with the aircraft or a server, and receive or send data, for example, send an operation command to the aircraft, receive image data recorded by the aircraft, send location information of the aircraft to the server, and receive a user recommendation list delivered by the server. The touchscreen display may be configured to display icons and interfaces of various applications, for example, display various interface elements on the operating interface of the aircraft, display the user recommendation list, and display a location identifier of a nearby aircraft. The touchscreen display may be further configured to detect a touch control signal acting on the touchscreen display. When a touch control signal is detected, an operation gesture is obtained according to the touch control signal generated on the touchscreen display. For example, the obtained operation gesture may be an operation of sliding in a direction, or an operation of following a user.

Figure 3:
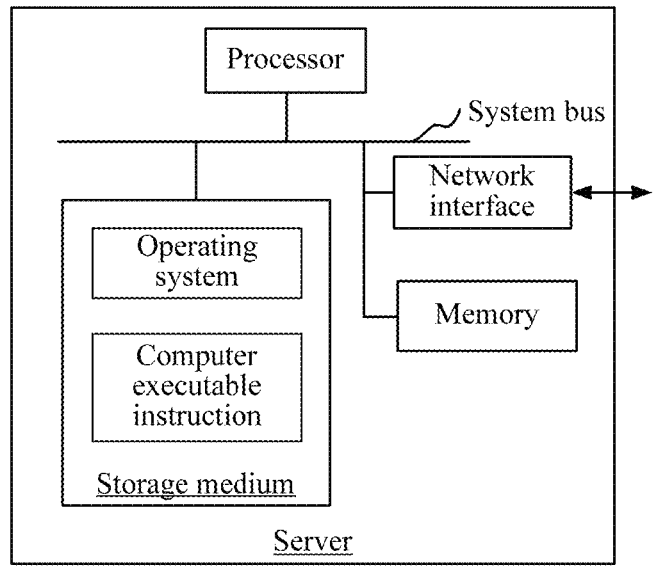
FIG. 3 is a diagram of an internal structure of a server according to an embodiment.

In an embodiment of the present disclosure, as shown in FIG. 3, a server is further provided. The server includes a processor, a storage medium, a memory, and a network interface that are connected by using a system bus. The storage medium stores an operating system, and further stores a computer executable instruction. When the computer executable instruction is executed by the processor, a user recommendation method may be implemented. The processor may be configured to provide computing and controlling capabilities, to support operations of an entire electronic device. The memory may be configured to provide an environment for implementation of a user recommendation apparatus in the storage medium. The network interface may be configured to perform network communication with the mobile terminal, and receive or send data, for example, receive location information of an aircraft uploaded by the mobile terminal, and deliver a user recommendation list to the mobile terminal.

Figure 4:
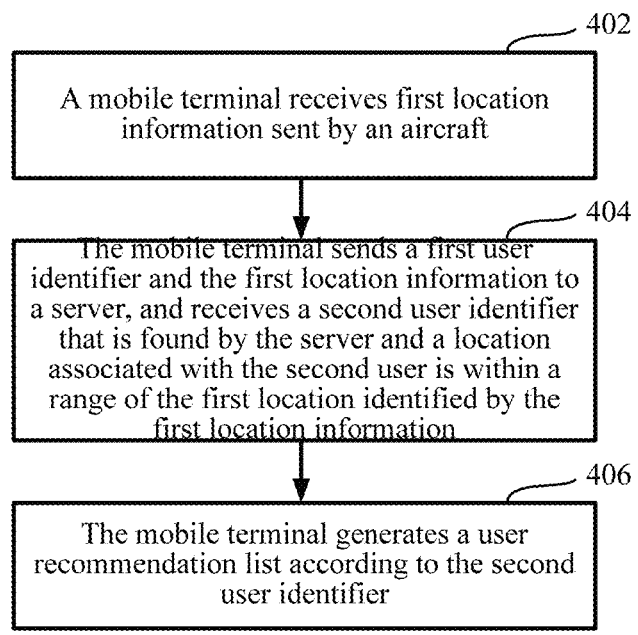
FIG. 4 is a flowchart of a user recommendation method according to an embodiment.

As shown in FIG. 4, in an embodiment of the present disclosure, a user recommendation method is provided. A description is provided by using an example in which the method is applied to a mobile terminal and specifically includes the following steps.

Step 402: A mobile terminal may receive first location information sent by an aircraft.

In this embodiment, the aircraft may be provided with a built-in GPS positioning module, and a location of the aircraft may be quickly positioned by using the built-in GPS module and a satellite antenna. Specifically, the mobile terminal is bound to the aircraft by using a first user identifier, and may log in, by using the first user identifier, to a software tool configured to operate the aircraft. The first location information obtained by the aircraft by means of positioning may be sent in real time to the mobile terminal. The mobile terminal may receive the first location information of the aircraft by using an application, and may display the location of the aircraft on an interface of the application.

Step 404: The mobile terminal may send a first user identifier and the first location information to a server, and receive a second user identifier that is found by the server and whose distance to the first location information is within a distance range.

In this embodiment, the mobile terminal may receive the first location information of the aircraft, and may correspondingly send the first user identifier and the first location information to the server for storage. A user identifier may be used for uniquely identifying a user, and may be an identifier number of a user on an instant messaging or social network application, or may be an identifier number of the mobile terminal. In this embodiment, the first user identifier may be a verified user identifier that logs in to the application in the mobile terminal.

Further, the server may receive in real time a large amount of location information of the aircraft sent by the mobile terminal, and corresponding user identifiers, and updates in real time user identifiers stored in the server and location information of aircrafts corresponding to the user identifiers. The second user identifier found by the server may be location information of a mobile terminal corresponding to the second user identifier, or may be location information of an aircraft bound to the second user identifier. Specifically, when obtaining an instruction that triggers to search for a nearby user, the mobile terminal may send the instruction to the server. The server may receive the instruction and search for, according to the first location information, the second user identifier which indicates a position at a distance range to the first location identified by the first location information. The distance range may be a default distance range of an application in the mobile terminal that sends the first location information, or may be a distance range that is set by a user by using an application and that is sent by the mobile terminal that sends the first location information.

Step 406: The mobile terminal may generate a user recommendation list according to the second user identifier.

In this embodiment, the mobile terminal may receive the second user identifier found by the server, that is, a to-be-recommended user identifier. Further, the mobile terminal may receive user information that is sent by the server and found by the server according to the second user identifier. The user information includes a user nickname, a user profile photo, and other social networking information. The mobile terminal may present the user information on the interface of the application, and generate the user recommendation list. The user may follow or friend users in the user recommendation list. After receiving an instruction of the user on following or friending the users, the mobile terminal may send the instruction to the server, so as to establish a relationship link between users.

Further, when generating the user recommendation list, the mobile terminal may sort the users according to some attribute features of the users; for example, recommend, according to user activeness, a user who has top-ranked user activeness at first priority. Certainly, the mobile terminal may randomly select some users, and preferentially display the users on the interface of the application.

Figure 5:
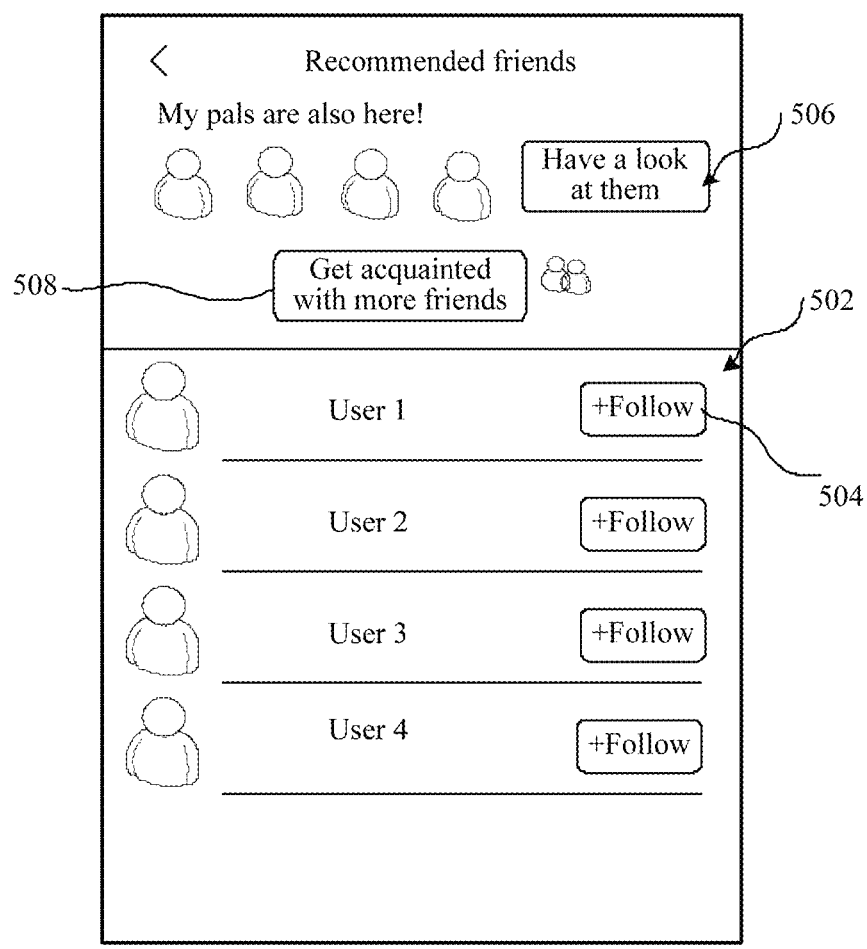
FIG. 5 is a schematic diagram of an interface according to an embodiment.

As shown in FIG. 5, a user recommendation list 502 is displayed on an interface of an application in a mobile terminal. For each recommended user, there is a corresponding add key 504 on the interface. The corresponding user may be followed or friended by clicking the "+Follow" key 504. Further, on the interface on which the user recommendation list 502 is displayed, a key 506 configured to view other recommended users and a key 508 configured to view more recommended users are provided. Another batch of user recommendation lists may be displayed on the interface of the application by triggering the key 506, and the user recommendation lists may be changed by triggering the key 508.

Because the mobile terminal receives positioning information of an aircraft operated by the mobile terminal, another nearby user may be found according to the positioning information, such as a user who operates an aircraft near the aircraft operated by the mobile terminal, or a user of a mobile terminal near the aircraft operated by the mobile terminal. As a result, searching for a user by using an aircraft can be performed in a more diversified and flexible manner.

Further, in an embodiment of the present disclosure, after step 404 of sending the first location information to the server by the mobile terminal, the method may further include: receiving second location information corresponding to the second user identifier, the second location information being location information of a mobile terminal corresponding to the second user identifier, or location information of an aircraft bound to the second user identifier; identifying a geographic location of the received second location information in a map application.

In this embodiment, after the second user identifier found by the server is received, the map application may be displayed on the mobile terminal, and the geographic location of the second location information corresponding to the second user identifier is identified in the map application. The second location information corresponding to the received user identifier is identified in the map application, so that a user can learn a location of a nearby user at a glance, and intuitively obtain a location of the aircraft operated by the user or a location of the mobile terminal carried by the user on the map.

Further, in an embodiment of the present disclosure, the step of identifying a geographic location of the second location information in a map application includes: obtaining the second user identifier that has a friendship link with the first user identifier; and identifying, in the map application, the geographic location of the second location information corresponding to the obtained second user identifier.

The friendship link includes a friendship link formed between friends in an instant messaging application, and a relationship link formed between a user and a followed person and a listened person in a social network application. In this embodiment, after finding the second user identifier which identifies location of the second user in a distance within a range of the first location identified by the first location information, the server may extract the second user identifier that has a friendship link with the first user identifier, and recommend the extracted second user identifier to the mobile terminal. The mobile terminal receives the second user identifier, and identifies the second location information corresponding to the received second user identifier in the map application.

In another embodiment, after finding the second user identifier whose distance to the second location information is within a distance range, the server recommends the second user identifier to the mobile terminal. The mobile terminal may extract the second user identifier that has a friendship link with the first user identifier, and identify, in the map application, the geographic location of the second location information corresponding to the extracted second user identifier.

The second location information is location information of a mobile terminal corresponding to the second user identifier, or location information of an aircraft bound to the second user identifier. Specifically, the second location information may be identified in the map application in a form of a bubble. In this embodiment, a friend of the user near the aircraft operated by the user of the mobile terminal may be identified in the map application that is displayed on the mobile terminal, that is, an identified friend may be a friend of the user of the mobile terminal on the instant messaging application, or a listened person and a followed person on the social network application. Distances between the mobile terminal carried by the friend and the aircraft operated by the friend and the aircraft operated by the user of mobile terminal are within the distance range. In this way, the user of the mobile terminal may flexibly find a nearby friend, and a novel social networking experience is provided.

Further, in an embodiment of the present disclosure, the interface of the application of the mobile terminal may provide a control configured to select to only display a user who has the friendship link with the first user identifier. After receiving the second user identifier that is found by the server and which has a second user position in a distance within a range of the first location identified by the first location information, the mobile terminal may identify the second user identifier in the map application. When it is obtained that the user clicks the control configured to display the user that has the friendship link with the first user identifier, the second user identifier that does not have the friendship link may be hidden, and the geographic location of the second location information of the second user identifier that has the friendship link with the first user identifier is displayed in the map application.

In an embodiment of the present disclosure, after the step of identifying a geographic location of the second location information in a map application, the method further includes: obtaining a triggering event of an identifier of the second location information displayed in the map application; obtaining the second user identifier corresponding to the triggered second location information; and extracting personal information corresponding to the second user identifier on an instant messaging or social network application and displaying the personal information.

In this embodiment, the geographic location identifier may be triggered to be selected and displayed in the map application by means of a clicking or sliding operation. For example, an operation of clicking the second location information displayed in the map application is obtained, and a corresponding second user identifier may be obtained according to second location information corresponding to a clicked identifier. A personal information extraction request is sent to the server. After receiving the request, the server may return personal information corresponding to the second user identifier on the instant messaging or social network application to the mobile terminal and display the personal information. The personal information on the instant messaging or social network application includes registration materials, a newly released social networking message, and the like.

Further, after the personal information corresponding to the second user identifier on the instant messaging or social network application is obtained and displayed, an operation of establishing, by the user, a friendship link with a user by using the interface of the application may further be obtained, such as an operation of friending a user or setting a user as a concerned person or a listened person, thereby establishing a friendship link between the first user identifier and the second user identifier. In this embodiment, another user near the aircraft operated by the user may be obtained, and a friendship link may be established between the user and the nearby user. Compared with a convention manner in which a friend can only be found by using the mobile terminal carried by the user, the present disclosure provides in real time a novel friending experience and enhances viscosity between users.

In an embodiment of the present disclosure, after the step of identifying a geographic location of the second location information in a map application, the method further includes: obtaining a social networking triggering event of a geographic location identifier of the second location information displayed in the map application; obtaining the second user identifier corresponding to the triggered second location information; and executing, according to the social networking triggering event, at least one social network application associated with the second user identifier.

In this embodiment, a social networking triggering operation may be performed on the geographic location identifier of the second location information displayed in the map application, so as to generate the social networking triggering event. For example, the geographic location identifier displayed in the map application is clicked, so as to generate the social networking triggering event. Further, the second user identifier corresponding to the triggered second location information is obtained, and at least one social network application associated with the second user identifier is performed according to the social networking triggering event. Execution of the social network application includes, but is not limited to, enabling an instant messaging application, viewing a personal log or personal information, viewing microblog, viewing personal space, and sending a friend message to the user. For example, the geographic location identifier displayed in the map application is clicked, the second user identifier corresponding to the second location information that corresponds to the geographic location identifier is obtained, a chat interface used for performing instant messaging with the second user identifier is opened, or a personal log and personal information corresponding to the second user identifier is presented.

More preferentially, only the second user identifier that has the friendship link with the first user identifier is displayed in the map application, the geographic location of the second location information corresponding to the second user identifier that has the friendship link with the first user identifier is identified in the map application, the social networking triggering event of the displayed geographic location identifier is obtained, the triggered second user identifier is obtained, and the at least one social network application associated with the second user identifier that has the friendship link with the first user identifier is executed according to the social networking triggering event. In this embodiment, for a geographic location identifier of a friend, a concerned person, or a listened person identified in the map application, execution of a corresponding social network application may be triggered by the social networking triggering event.

In an embodiment of the present disclosure, after the step of sending the first location information to the server by the mobile terminal, the method further includes: obtaining a triggering event of an identifier displayed in the map application; obtaining location information corresponding to the identifier according to the triggering event; and extracting, according to the location information, corresponding social networking information related to a location and displaying the social networking information.

In this embodiment, the user may click, on the interface of the application of the mobile terminal, the geographic location identifier displayed in the map application, and the mobile terminal may send the corresponding location information to the server. The location information includes the first location information and the second location information, and the server extracts, according to the location information, the corresponding social networking information related to the location and displays the social networking information. The social networking information related to the location includes, but is not limited to, social networking information that is related to the location and that is of the user on various social network applications. The social networking information is, for example, access information, traveling information, and related pictures related to the location information.

In this embodiment, the geographic location is associated with the social networking information. By triggering, on the mobile terminal, the identifier displayed in the map application, the social networking information of the corresponding location may be quickly obtained, and a novel social networking experience is provided, which is used more flexibly and improves user experience.

In an embodiment of the present disclosure, the second location information is the location information of the aircraft bound to the second user identifier; and after the step of identifying a geographic location of the second location information in a map application, the method further includes: obtaining a real-time video viewing event of a geographic location identifier of the second location information displayed in the map application; obtaining, according to the real-time video viewing event, the second user identifier corresponding to the second location information and the location information of the aircraft bound to the second user identifier; and obtaining real-time video data that is collected in real time by the aircraft bound to the second user identifier and displaying the real-time video data.

In this embodiment, the server may receive the first user identifier and the first location information sent by the mobile terminal, and finds, according to the first location information, the second location information which identifies a second location in a distance within a range of the first location identified by the first location information, the second location information being the location information of the aircraft bound to the second user identifier. The aircraft is generally operated by a corresponding mobile terminal. Similarly, the mobile terminal may control flying and recording of the aircraft by log in, by using the second user identifier, to the application that operates the aircraft. The positioning information of the aircraft is sent in real time to the mobile terminal, and the mobile terminal uploads in real time the location information of the aircraft to the server. Further, the mobile terminal may control the aircraft to record a video, and send, by means of wireless network transmission, the real-time video data obtained by recording to the mobile terminal, and the mobile terminal uploads the real-time video data to the server by using a network.

The server may receive the real-time video data uploaded by the mobile terminal, and correspondingly stores the real-time video data with the user identifier bound to the aircraft. Further, the real-time video viewing event may be initiated on the geographic location identifier of the second location information displayed in the map application. For example, by clicking the displayed geographic location identifier to trigger a corresponding video viewing key to generate a video viewing event. Further, the mobile terminal obtains, according to the video viewing event, the second user identifier corresponding to the second location information and the location information of the aircraft bound to the second user identifier, the location information of the aircraft being the second location information. The server may receive the video viewing event, and finds, according to the second user identifier, the real-time video data that is correspondingly stored. The real-time video data is real-time video data collected by the aircraft bound to the second user identifier. The real-time video data is sent to the mobile terminal, and the mobile terminal receives the real-time video data collected in real time by the aircraft bound to the second user identifier and displays the real-time video data.

In this embodiment, for the geographic location identifier of the second location information displayed in the map application, the real-time video data collected in real time by the aircraft operated by a user corresponding to the geographic location identifier may be viewed in real time by means of a simply triggering operation. The user may view data collected by an aircraft operated by a user or a friend near the user. A novel social networking mode is provided, and interaction between users is enhanced.

Figure 6:
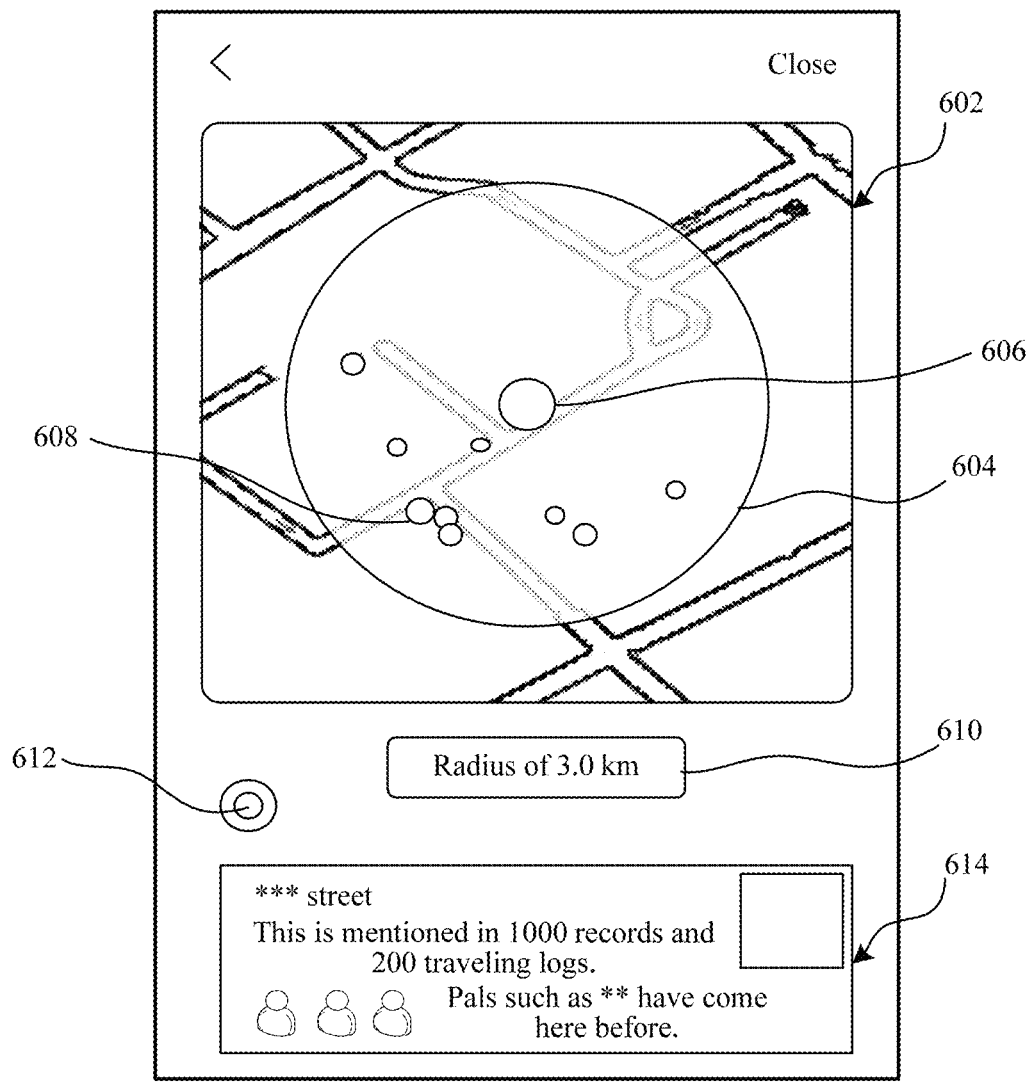
FIG. 6 is another schematic diagram of an interface according to an embodiment.

FIG. 6 shows an application interface of a mobile terminal according to an embodiment. As shown in FIG. 6, the mobile terminal may display a location of a currently-operated aircraft and a location of a nearby user by enabling an interface of a corresponding application. Specifically, the mobile terminal may receive first location information of the aircraft operated by the mobile terminal, load an electronic map 602, and identify a geographic location of the first location information in the map application 602. The geographic location of the first location information may be identified at a central position in the map application, for example, a geographic location identifier 606 in FIG. 6. The mobile terminal receives a second user identifier that is found by the server and, which identifies a second location of the mobile terminal in a distance within a range of the first location identified by the first location information, and identifies a geographic location of second geographic location information corresponding to the second user identifier in the map application, such as a geographic location identifier 608 in FIG. 6. It may be understood that the geographic location identifier identified in the map application may be presented in various forms, such as an original point, or a bubble. Only one presentation form is shown in FIG. 6.

Further, only the geographic location identifier 606 of the first location information and the geographic location identifier 608 of the second geographic location information corresponding to the second user identifier that has a friendship link with a first user identifier are displayed in the map application. More preferentially, geographic locations of all received second location information may be identified in the map application. A geographic location identifier of the second geographic location information corresponding to the second user identifier that has the friendship link with the first user identifier is presented in different colors and shapes, to distinguish a common nearby user from a nearby friend.

Further, as shown in FIG. 6, a distance range 610 may further be presented on the interface of the application, and the distance range may be a range set by the server or set by a user on the interface of the application. The mobile terminal loads and displays the map application 602 according to the distance range, and displays the geographic location identifier in the map application 602 according to the distance range. The circular area 604 may further be displayed in the map application, and the circular area displays an area of a currently-displayed geographic location identifier.

Further, as shown in FIG. 6, an interface element 612 used for returning to an aircraft operating interface is provided on the interface of the application. If the interface element 612 is triggered, the aircraft operating interface is returned to, so as to continue to operate the aircraft to control flying and record an image.

Further, as shown in FIG. 6, a social networking triggering event of the geographic location identifier of the second location information displayed in the map application may further be obtained. For example, the user may click the geographic location identifier 608 to trigger at least one social network application associated with the second user identifier, for example, to enable an instant messaging application, view a personal log or personal information, view microblog, view personal space, and send a friend message to the user.

Further, if the second location information is the location information of the aircraft bound to the second user identifier, the geographic location identifier of the second location information may be distinguished by using different colors and shapes. The geographic location information identifier is clicked, and real-time video data collected in real time by the aircraft that is bound to the second user identifier corresponding to the geographic location identifier may be obtained and displayed.

Further, as shown in FIG. 6, after the geographic location identifier 608 is triggered, corresponding social networking information 614 related to a location of the geographic location identifier 608, such as access information, traveling information, and related pictures related to the location information, may further be displayed on the interface of the application.

Figure 7:
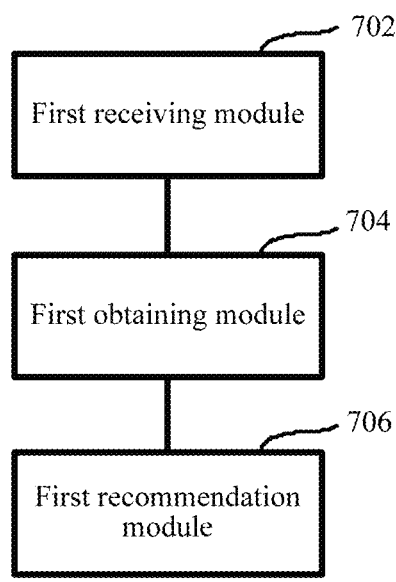
FIG. 7 is a structural block diagram of a mobile terminal according to an embodiment.

As shown in FIG. 7, in an embodiment of the present disclosure, a mobile terminal is further provided. An internal structure of the mobile terminal may correspond to the structure shown in FIG. 2. All of or some of modules described below may be implemented by software, hardware, or a combination thereof. As shown in FIG. 7, in an embodiment of the present disclosure, the mobile terminal includes a first receiving module 702, a first obtaining module 704, and a first recommendation module 706. In the present disclosure, a module refers to one or more computer programs stored in computer readable medium. When executed by one or more processors, the computer programs of each module implement their corresponding functions as described in relation to FIGS. 7, 8, 10, 11, etc.

As shown in FIG. 7, the first receiving module 702 may be configured to receive first location information sent by an aircraft.

The first obtaining module 704 may be configured to: send a first user identifier and the first location information to a server, and receive a second user identifier that is found by the server and whose distance to the first location information is within a distance range.

The first recommendation module 706 may be configured to generate a user recommendation list according to the received second user identifier.

Figure 8:
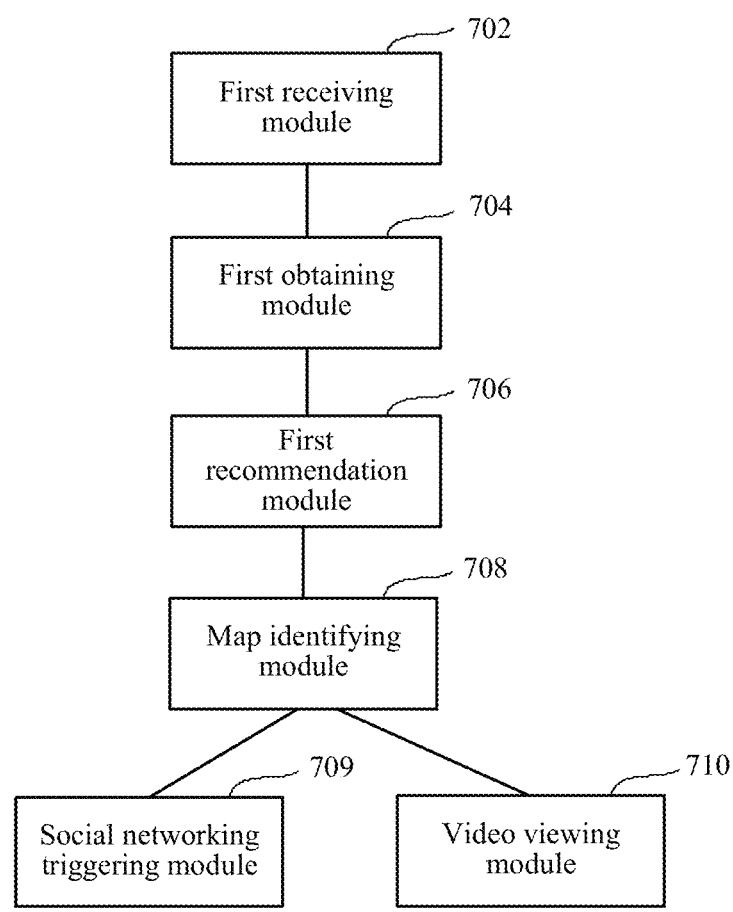
FIG. 8 is a structural block diagram of a mobile terminal according to another embodiment.

In an embodiment of the present disclosure, as shown in FIG. 8, the user recommendation apparatus further includes a map identifying module 708.

The map identifying module 708 may be configured to: receive second location information corresponding to the second user identifier, and identify, in a map application, a geographic location of the second location information corresponding to the received second user identifier. The second location information is location information of a mobile terminal corresponding to the second user identifier, or location information of an aircraft bound to a mobile terminal corresponding to the second user identifier.

In an embodiment of the present disclosure, the map identifying module 708 is further configured to: obtain the second user identifier that has a friendship link with the first user identifier; and identify, in the map application, the geographic location of the second location information corresponding to the obtained second user identifier.

In an embodiment of the present disclosure, the user recommendation apparatus further includes a social networking triggering module 709.

The social networking triggering module 709 may be configured to: obtain a triggering event of an identifier of the second location information displayed in the map application; obtain the second user identifier corresponding to the triggered second location information; and extract personal information corresponding to the second user identifier on an instant messaging or social network application and display the personal information.

In an embodiment of the present disclosure, the social networking triggering module 709 may be configured to: obtain a social networking triggering event of a geographic location identifier of the second location information displayed in the map application; obtain the second user identifier corresponding to the triggered second location information; and execute, according to the social networking triggering event, at least one social network application associated with the second user identifier.

In an embodiment of the present disclosure, the user recommendation apparatus further includes a video viewing module 710.

The video viewing module 710 may be configured to: obtain a real-time video viewing event of a geographic location identifier of the second location information displayed in the map application; obtain, according to the real-time video viewing event, the second user identifier corresponding to the second location information and the location information of the aircraft bound to the second user identifier; and obtain real-time video data that is collected in real time by the aircraft bound to the second user identifier and display the real-time video data.

In an embodiment of the present disclosure, the user recommendation apparatus further includes an information displaying module.

The information displaying module (not shown in the figure) may be configured to: obtain a triggering event of an identifier displayed in the map application; obtain location information corresponding to the identifier according to the triggering event; and extract, according to the obtained location information, corresponding social networking information related to a location and display the social networking information.

Further, the first location information is identified at a central position on the displayed electronic map.

Figure 9:
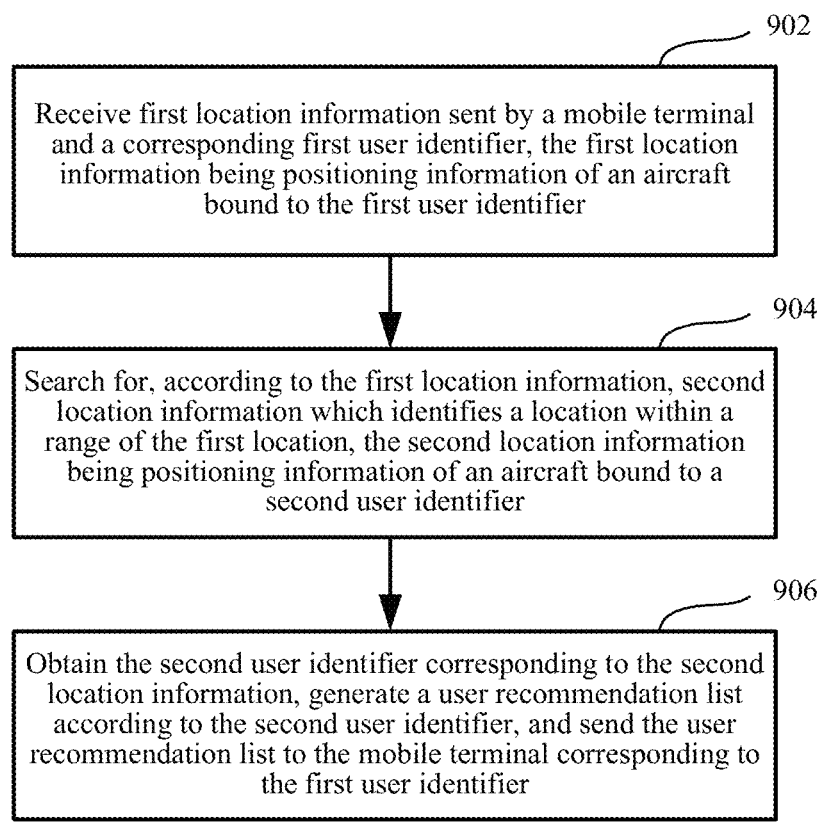
FIG. 9 is a flowchart of a user recommendation method according to another embodiment.

As shown in FIG. 9, in an embodiment of the present disclosure, a user recommendation method is further provided. A description is provided by using an example in which the method is applied to a server and specifically includes the following steps.

Step 902: Receive first location information sent by a mobile terminal and a corresponding first user identifier, the first location information being positioning information of an aircraft bound to the first user identifier.

In this embodiment, the aircraft may be provided with a built-in GPS positioning module, and a location of the aircraft may be quickly positioned by using the built-in GPS module and a satellite antenna. Specifically, the mobile terminal may be bound to the aircraft by using a first user identifier, and may log in, by using the first user identifier, to a software tool configured to operate the aircraft. The first location information obtained by the aircraft by means of positioning may be sent in real time to the mobile terminal. The mobile terminal may receive the first location information of the aircraft by using an application, and may display the location of the aircraft on an interface of the application. In this embodiment, the server may receive in real time a large amount of location information of the aircraft sent by the mobile terminal, and corresponding user identifiers, and update in real time user identifiers stored in the server and location information of aircrafts corresponding to the user identifiers.

Step 904: Search for, according to the first location information, second location information whose distance to the first location information is within a distance range, the second location information being positioning information of an aircraft bound to a second user identifier.

In this embodiment, when receiving the first location information of the aircraft, the mobile terminal may send the first location information and the corresponding first user identifier to the server, and the server may receive the first location information and the first user identifier sent by the mobile terminal. When receiving an instruction of the mobile terminal on searching for a nearby user, the mobile terminal may further search for the second location information whose distance to the first location information is within the distance range. The distance range may be a default distance range of an application in the mobile terminal that sends the first location information, or may be a distance range that is set by a user by using an application and that is sent by the mobile terminal that sends the first location information.

Step 906: Obtain the second user identifier corresponding to the second location information, generate a user recommendation list according to the second user identifier, and send the user recommendation list to the mobile terminal corresponding to the first user identifier.

In this embodiment, after finding the second location information, the server may obtain the corresponding second user identifier, generate the user recommendation list according to the second user identifier, and send the user recommendation list to the mobile terminal that may send the first location information for displaying. The mobile terminal may receive user information sent by the server and found by the mobile terminal according to the second user identifier. The user information includes a user nickname, a user profile photo, and other social networking information. The mobile terminal may present the user information on the interface of the application, and generate the user recommendation list. The user may follow or friend users in the user recommendation list. After receiving an instruction of the user on following or friending the users, the mobile terminal may send the instruction to the server, so as to establish a relationship link between users.

In an embodiment of the present disclosure, after step 906, the method further includes: receiving location information obtained by the mobile terminal by triggering a geographic location identifier displayed in a map application; and obtaining, according to the location information, corresponding social networking information related to a location, and returning the social networking information to the mobile terminal.

In this embodiment, with reference to FIG. 6, after receiving the second user identifier found by the server, the mobile terminal may log in to the map application by using the mobile terminal, and identify, in the map application, the geographic location of the second location information according to the second location information corresponding to the second user identifier. The user may click, on the interface of the application of the mobile terminal, the identifier displayed in the map application, and the mobile terminal may send corresponding location information to the server. The location information may include the first location information and the second location information, and the may server extract, according to the location information, the corresponding social networking information related to the location and displays the social networking information. The social networking information includes, but is not limited to, social networking information that is related to the location and that is of the user on various social networking applications. The social networking information is, for example, access information, traveling information, and related pictures of the location information.

In an embodiment of the present disclosure, the second location information may be the location information of the aircraft bound to the second user identifier, and the user recommendation method further may include: obtaining a real-time video viewing event performed by the mobile terminal on the geographic location identifier of the second location information displayed in the map application; obtaining, according to the real-time video viewing event, the second user identifier corresponding to the second location information and the location information of the aircraft bound to the second user identifier; and obtaining real-time video data that is collected in real time by the aircraft bound to the second user identifier and sending the real-time video data to the mobile terminal for displaying.

In this embodiment, the server may obtain in real time a large amount of video data that is collected in real time by the aircraft operated by the mobile terminal and that is uploaded by the mobile terminal, and correspondingly stores the video data with the user identifier bound to the aircraft. When receiving a real-time video viewing event performed by a mobile terminal on a geographic location identifier of a piece of second location information in the map application, real-time video data corresponding to the user identifier corresponding to the location information may be sent to the mobile terminal, and the mobile terminal may display in real time, real-time video data collected by aircrafts operated by other mobile terminals.

Figure 10:
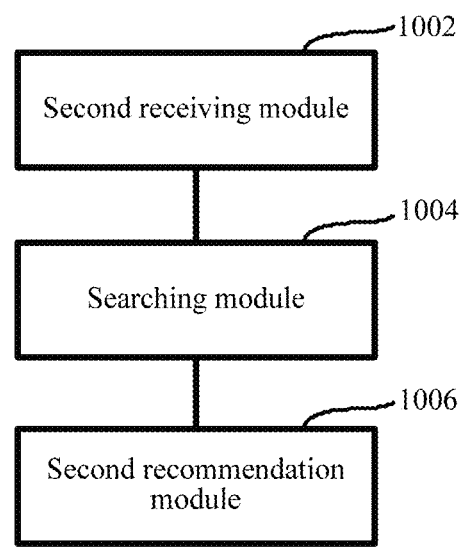
FIG. 10 is a structural block diagram of a server according to another embodiment.

As shown in FIG. 10, in an embodiment of the present disclosure, a server is further provided. An internal structure of the server may correspond to the structure shown in FIG. 3. All of or some of modules described below may be implemented by software, hardware, or a combination thereof.

As shown in FIG. 10, in an embodiment of the present disclosure, the server may include a second receiving module 1002, a searching module 1004, and a second recommendation module 1006.

The second receiving module 1002 may be configured to receive first location information sent by a mobile terminal and a corresponding first user identifier, the first location information being positioning information of an aircraft bound to the first user identifier.

The searching module 1004 may be configured to search for, according to the first location information, second location information whose distance to the first location information is within a distance range, the second location information being positioning information of an aircraft bound to a second user identifier.

The second recommendation module 1006 may be configured to: obtain the second user identifier corresponding to the second location information, generate a user recommendation list according to the second user identifier, and send the user recommendation list to the mobile terminal corresponding to the first user identifier.

Figure 11:
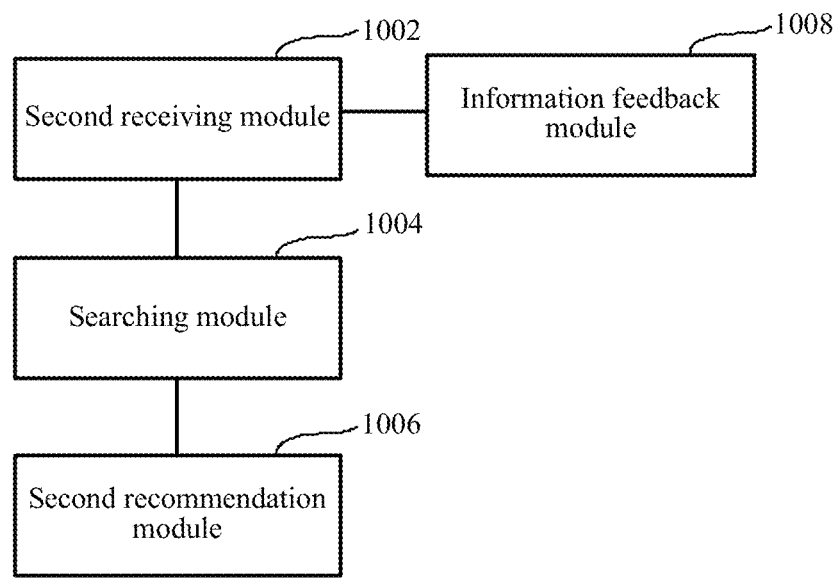
FIG. 11 is a structural block diagram of a server according to still another embodiment.

In an embodiment of the present disclosure, as shown in FIG. 11, the second receiving module 1002 may be further configured to receive location information obtained by the mobile terminal by triggering a geographic location identifier displayed in a map application.

The user recommendation apparatus may further include an information feedback module 1008.

The information feedback module 1008 may be configured to obtain, according to the location information, corresponding social networking information related to a location, and returning the social networking information to the mobile terminal.

In an embodiment of the present disclosure, the information feedback module 1008 may be further configured to: obtain a real-time video viewing event performed by the mobile terminal on the geographic location identifier of the second location information displayed in the map application; obtain, according to the real-time video viewing event, the second user identifier corresponding to the second location information and the location information of the aircraft bound to the second user identifier; and obtain real-time video data that is collected in real time by the aircraft bound to the second user identifier and send the real-time video data to the mobile terminal for displaying.

Figure 12:
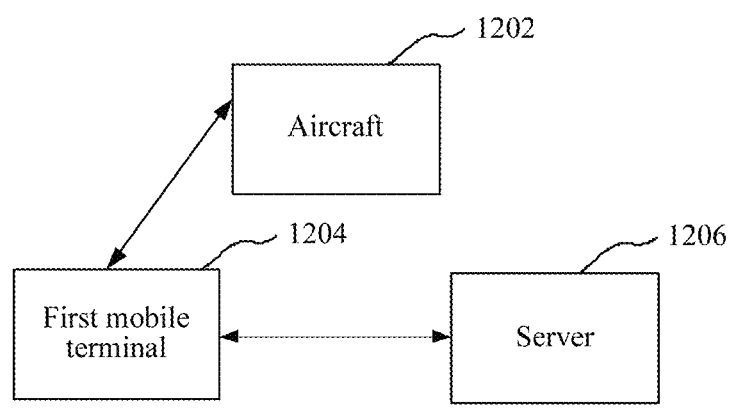
FIG. 12 is a schematic structural diagram of a user recommendation system according to an embodiment.

As shown in FIG. 12, in an embodiment of the present disclosure, a user recommendation system is further provided. The system may include an aircraft 1202, a first mobile terminal 1204, and a server 1206.

The aircraft 1202 is configured to: position the aircraft, and send first location information obtained by means of positioning, to the first mobile terminal 1204 that corresponds to a first user identifier bound to the aircraft.

Specifically, the aircraft 1202 may include, but may not be limited to, various unmanned aerial vehicles and flying toys, which have functions of performing positioning and data transmission. The aircraft 1202 is provided with a built-in GPS positioning module, and a location of the aircraft 1202 may be quickly positioned by using the built-in GPS module and a satellite antenna. The first mobile terminal 1204 may be a mobile terminal that operates the aircraft 1202, or may be various smartphones, tablet computers, and wearable electronic devices. The first mobile terminal 1204 may log in, by using the first user identifier, to an application used for operating the aircraft 1202, and be bound to the aircraft 1202 by using the first user identifier. In a process of operating the aircraft 1202, the first mobile terminal 1204 may maintain a connection to the aircraft 1202, receive the first location information transmitted in real time by the aircraft 1202, and correspondingly store the first user identifier and the first location information.

The first mobile terminal 1204 may be configured to: receive the first location information, and send the first user identifier and the first location information to the server.

Specifically, the first mobile terminal 1204 may connect to the server 1206 by using a network, and may correspondingly send the first location information and the first user identifier that are received in real time, to the server 1206, so that the server 1206 performs corresponding processing according to the received first location information and first user identifier.

The server 1206 may be configured to: receive the first location information, search for a second user identifier whose distance to the first location information is within a distance range, and recommend the second user identifier to the first mobile terminal 1204.

Specifically, the distance range may be a set default range, or a received range sent by the first mobile terminal 1204 and set by a user.

Further, in an embodiment of the present disclosure, the server 1206 may be further configured to send second location information corresponding to the second user identifier to the first mobile terminal. The second location information is location information of a second mobile terminal corresponding to the second user identifier, or location information of an aircraft bound to the second user identifier.

Specifically, in an embodiment of the present disclosure, the second mobile terminal may log in, by using the second user identifier, to an application used for operating another aircraft, and be bound to the aircraft by using the second user identifier. The aircraft may send in real time the location information (that is, the second location information) of the aircraft to the second mobile terminal. The second mobile terminal may be connected to the server 1206 by using a network, and correspondingly may send in real time the second location information and the second user identifier to the server 1206. The server 1206 may find the second location information whose distance to the first location information is within the distance range, and recommend the second user identifier corresponding to the second location information to the first mobile terminal 1204.

In another embodiment, the second mobile terminal may have a positioning function. The second mobile terminal may obtain the location information (that is, the second location information) of the second mobile terminal, and correspondingly send the location information with the second user identifier to the server 1206. The server 1206 may find the second location information whose distance to the first location information is within the distance range, and recommend the second user identifier corresponding to the second location information to the first mobile terminal 1204.

Further, after receiving the second user identifier recommended by the server 1206, the first mobile terminal 1204 may identify the second location information corresponding to the second user identifier in the map application, for example, identify the second location information by using an icon of a bubble. More preferentially, only the second location information corresponding to the second user identifier that has a friendship link with the first user identifier may be identified.

Further, the first mobile terminal 1204 may obtain an operation of clicking, by a user, an identifier displayed in the map application, obtain the second user identifier corresponding to clicked location information, extract personal information on an instant messaging or social network application corresponding to the user identifier and display the personal information. The user may select to view the personal information corresponding to the second user identifier, and selects the second user identifier to establish a friendship link between the first user identifier and the second user identifier. In addition, the first mobile terminal 1204 may further obtain the clicked location information (including the first location information and the second location information), extract from the server, social networking information corresponding to the location information and related to the location, and display the social networking information.

In an embodiment of the present disclosure, the first mobile terminal 1204 may be configured to: obtain a social networking triggering event of a geographic location identifier of the second location information displayed in the map application; obtain the second user identifier corresponding to the triggered second location information; and execute, according to the social networking triggering event, at least one social network application associated with the second user identifier.

In an embodiment of the present disclosure, the second location information may be the location information of the aircraft bound to the second user identifier, and the first mobile terminal 1204 is further configured to: obtain a real-time video viewing event of the geographic location identifier of the second location information displayed in the map application; obtain, according to the real-time video viewing event, the second user identifier corresponding to the second location information and the location information of the aircraft bound to the second user identifier; and obtain real-time video data that is collected in real time by the aircraft bound to the second user identifier and display the real-time video data.

A person of ordinary skill in the art may understand that all or some of the processes of the methods in the embodiments may be implemented by a computer program instructing relevant hardware. The program may be stored in a computer readable storage medium. When the program is executed, the processes of the methods in the embodiments are performed. The foregoing storage medium may include: a magnetic disk, an optical disc, a read-only memory (ROM), or a random access memory (RAM).

Technical features of the foregoing embodiments may be arbitrarily combined. For brevity of the description, not all possible combinations of the technical features in the foregoing embodiments are described. However, as long as the combinations of the technical features are not contradicted, the combinations shall be considered as the scope recorded in this specification.

The foregoing embodiments only describe several implementations of the present disclosure, and their description is specific and detailed, but cannot therefore be understood as a limitation to the patent scope of the present disclosure. It should be noted that a person of ordinary skill in the art may further make some variations and improvements without departing from the concept of the present disclosure, and the variations and improvements belong to the protection scope of the present disclosure. Therefore, the protection scope of the present disclosure should be subject to the protection scope of the appended claims.

What is claimed is:

1. A user recommendation method, comprising:
   receiving first location information sent by an aircraft, the first location information indicating a first location of a first user;
   sending a first user identifier and the first location information to a server;
   receiving a second user identifier that is found by the server, a location associated with the second user is within a range of the first location; and
   generating a user recommendation list according to the second user identifier.

2. The method according to claim 1, the method further comprising:
   receiving second location information corresponding to the second user identifier, the second location information being location information of a mobile terminal corresponding to the second user identifier, or location information of an aircraft bound to the second user identifier; and
   identifying a geographic location of the second location information in a map application.

3. The method according to claim 2, further comprising:
   obtaining the second user identifier that has a friendship link with the first user identifier; and
   identifying, in the map application, the geographic location of the second location information.

4. The method according to claim 2, further comprising:
   obtaining a social networking triggering event of a geographic location identifier of the second location information displayed in the map application;
   obtaining the second user identifier corresponding to the triggered second location information; and
   executing, according to the social networking triggering event, at least one social network application associated with the second user identifier.

5. The method according to claim 2, further comprising:
   obtaining a real-time video viewing event of a geographic location identifier of the second location information displayed in the map application;

obtaining, according to the real-time video viewing event, the second user identifier corresponding to the second location information and the location information of the aircraft bound to the second user identifier; and obtaining real-time video data that is collected in real time by the aircraft bound to the second user identifier and displaying the real-time video data.

6. A user recommendation method, comprising:
receiving first location information sent by a mobile terminal and a corresponding first user identifier, the first location information indicating a first location of an aircraft bound to the first user identifier;
searching for second location information that identifies a location within a range of the first location, the second location information indicating a second location of an aircraft bound to a second user identifier;
obtaining the second user identifier corresponding to the second location information;
generating a user recommendation list according to the second user identifier; and
sending the user recommendation list to the mobile terminal corresponding to the first user identifier.

7. The method according to claim 6, the method further comprising:
receiving location information obtained by the mobile terminal by triggering a geographic location identifier displayed on a map; and
obtaining, according to the location information, corresponding social networking information related to a location, and returning the social networking information to the mobile terminal.

8. A mobile terminal, comprising a memory and a processor, the memory storing an computer program instruction, and when executed by the processor, the instruction causing the processor to perform:
receiving first location information sent by an aircraft;
sending a first user identifier and the first location information to a server;
receiving a second user identifier that is found by the server, a location associated with the second user is within a range of the first location; and
generating a user recommendation list according to the second user identifier.

9. The mobile terminal according to claim 8, the processor further performing:
receiving second location information corresponding to the second user identifier, the second location information being location information of a mobile terminal corresponding to the second user identifier, or location information of an aircraft bound to the second user identifier; and
identifying a geographic location of the second location information in a map application.

10. The mobile terminal according to claim 9, the processor further performing:
obtaining the second user identifier that has a friendship link with the first user identifier; and
identifying, in the map application, the geographic location of the second location information.

11. The mobile terminal according to claim 9, the processor further performing:
obtaining a social networking triggering event of a geographic location identifier of the second location information displayed in the map application;
obtaining the second user identifier corresponding to the triggered second location information; and executing, according to the social networking triggering event, at least one social network application associated with the second user identifier.

12. The mobile terminal according to claim 9, the processor further performing:
obtaining a real-time video viewing event of a geographic location identifier of the second location information displayed in the map application;
obtaining, according to the real-time video viewing event, the second user identifier corresponding to the second location information and the location information of the aircraft bound to the second user identifier; and
obtaining real-time video data that is collected in real time by the aircraft bound to the second user identifier and displaying the real-time video data.

13. A server, comprising a memory and a processor, the memory storing one or more computer program instructions, and when executed by the processor, the computer program instructions causing the processor to perform:
receiving first location information sent by a mobile terminal and a corresponding first user identifier, wherein the first location information indicating a first location of an aircraft bound to the first user identifier;
searching for second location information that identifies a location within a range of the first location, the second location information indicating a second location of an aircraft bound to a second user identifier; and
obtaining the second user identifier corresponding to the second location information;
generating a user recommendation list according to the second user identifier; and sending the user recommendation list to the mobile terminal corresponding to the first user identifier.

14. The server according to claim 13, the processor further performing:
receiving location information obtained by the mobile terminal by triggering a geographic location identifier displayed in a map application; and
obtaining, according to the location information, corresponding social networking information related to a location, and returning the social networking information to the mobile terminal.

15. A user recommendation system, comprising:
an aircraft, configured to: position the aircraft, and send first location information to a first mobile terminal that corresponds to a first user identifier bound to the aircraft, the first location information indicating a first location of the aircraft;
the first mobile terminal, configured to: receive the first location information, and send the first user identifier and the first location information to a server; and
the server, configured to: receive the first location information, search for a second user identifier that identifies a location within a range of the first location, and recommend the second user identifier to the first mobile terminal.

16. The system according to claim 15, wherein the server is further configured to send second location information corresponding to the second user identifier to the first mobile terminal, the second location information indicating a second location of a second mobile terminal corresponding to the second user identifier, or a second location of an aircraft bound to the second user identifier.

17. The system according to claim 15, wherein the first mobile terminal is further configured to display data related to the second user identifier.

18. The system according to claim 15, wherein the first mobile terminal is further configured to display real-time video data received from the server.

\* \* \* \* \*